United States Patent
Jungreis

(10) Patent No.: US 6,169,390 B1
(45) Date of Patent: Jan. 2, 2001

(54) FLYWHEEL-MICROTURBINE SYSTEM

(75) Inventor: Aaron M. Jungreis, Cary, NC (US)

(73) Assignee: ABB Power T&D Company Inc., Raleigh, NC (US)

( * ) Notice: Under 35 U.S.C. 154(b), the term of this patent shall be extended for 0 days.

(21) Appl. No.: 09/310,652

(22) Filed: May 12, 1999

(51) Int. Cl.$^7$ .................................................. H02J 9/08
(52) U.S. Cl. .................................. 322/4; 290/52; 307/64
(58) Field of Search ........................... 290/52, 2; 322/4, 322/10, 14; 307/64, 67

(56) References Cited

U.S. PATENT DOCUMENTS

| | | | |
|---|---|---|---|
| 2,783,393 | 2/1957 | Lindahl et al. | 307/64 |
| 2,922,896 | 1/1960 | Öhlund | 307/68 |
| 3,526,778 | 9/1970 | Crocker et al. | 290/30 |
| 4,228,360 | * 10/1980 | Navarro | 290/43 |
| 4,460,834 | 7/1984 | Gottfried | 307/64 |
| 4,830,412 | 5/1989 | Raad et al. | 290/31 |
| 5,055,700 | 10/1991 | Dhyanchand | 290/31 |
| 5,055,764 | 10/1991 | Rozman et al. | 322/10 |
| 5,283,471 | 2/1994 | Raad | 290/46 |
| 5,309,081 | 5/1994 | Shah et al. | 322/10 |
| 5,646,458 | 7/1997 | Bowyer et al. | 307/67 |
| 5,767,591 | 6/1998 | Pinkerton | 307/64 |
| 5,811,960 | 9/1998 | Van Sickle et al. | 322/4 |
| 5,994,794 | * 11/1999 | Wehrlen | 307/66 |
| 6,107,693 | * 8/2000 | Mongia et al. | 290/52 |

* cited by examiner

Primary Examiner—Nicholas Ponomarenko
(74) Attorney, Agent, or Firm—Woodcock Washburn Kurtz Mackiewicz & Norris LLP

(57) ABSTRACT

A power supply system for providing long and short term backup power to a load comprises a microturbine system, a flywheel system, and a power electronics module. The microturbine system includes a microturbine attached to a first, high speed motor-generator that includes a first stator, and the flywheel system includes a flywheel attached to a second motor-generator. The microturbine system is started by a direct connection of a high frequency AC voltage output of the flywheel system (in the range of from about 500 Hz to about 2 kHz) to the stator of the first motor-generator. The direct connection of the high frequency AC voltage to the stator involves no intervening electronics.

23 Claims, 5 Drawing Sheets

FLYWHEEL-MICROTURBINE SYSTEM

FIELD OF THE INVENTION

The present invention relates generally to power transmission and distribution systems, and more particularly to a flywheel-microturbine system for providing long and short term backup power to a load.

BACKGROUND OF THE INVENTION

Microturbine Systems for Long Term Backup Power

Recent improvements in permanent magnet and other materials have led to the production of high speed permanent magnet generators that are especially suitable for use with microturbines. When connected to a microturbine, a high speed permanent magnet generator is typically operated as a motor for starting the microturbine. During this starting phase, an inverter supplies high frequency AC voltage to the generator's stator. After, the turbine has come up to speed, it provides power to a load (backup power) or directly to the power grid (grid-parallel operation), through a power electronics converter.

FIG. 1 schematically depicts a typical system incorporating a microturbine prime mover 10, high speed generator 12, and power electronics 14 for both starting and normal operation. During starting, either the power grid or some form of backup energy provides power to the DC bus. This energy flows through a high frequency inverter N2 to operate the high speed generator 12 as a motor. When the turbine 10 comes up to some high speed, spark and fuel are applied. The turbine 10 then runs on its own, coming up to full operating speed.

The high speed generator 12 then provides power to the DC bus through a rectifier D1. Another inverter N1 takes the energy coming into the DC bus and converts it to the power grid frequency and voltage (via a transformer T1, which is not always needed) to either drive a load or inject current into the power grid. Inverter N1 may also be made to function as the starting inverter for applications where the device does not need to output power during the starting phase.

Flywheel Systems for Short Term Backup Power

A flywheel, in conjunction with power electronics, can function as an energy storage device for a power system. Typically, a flywheel is spun up to speed using a high frequency AC inverter. During discharge, the flywheel typically delivers energy through a rectifier to a DC bus.

FIG. 2 illustrates a typical system incorporating a flywheel 16 and the power electronics 14' needed to interface with the load or power grid. This diagram shows the electronics 14' in an on-line UPS layout; however, other topologies, such as off-line or line-interactive, are possible. During normal operation, the power grid provides power to the DC bus through rectifier D1. Power flows through the DC bus to inverter N2 to spin the flywheel up to speed and to add energy as various loss mechanisms deplete the flywheel's total energy storage. Power also flows through the DC bus to inverter N1 to power the load or add energy to the grid.

When the power grid fails, the flywheel discharges current through a rectifier D2 to the DC bus. The rectifier may be built into inverter N2 or be external to N2 as shown. Inverter N1 only needs to provide voltage at the frequency of the power grid, but it must be rated for full load power. Inverter N2 must provide high frequency, but it only needs to be rated for a fraction of full load power—assuming that the flywheel spin-up speed is allowed to be much lower than the flywheel's discharge speed.

Power quality systems of the kind described above often incorporate short term backup systems and long term backup systems. The short term backup systems provide stored energy (via a flywheel, battery, capacitor, or the like) that is available at all times. The long term backup power systems generate power (e.g., with a diesel generator) that is available only after a delay on the order of a few seconds. The delay is a result of having to bring the generator's prime mover up to operating speed. When flywheel energy storage is used in combination with microturbine power generation, the overall system suffers because of typically long spin up delays in the microturbine. One solution to this problem is to use over-rated power electronics for spinning up the turbine, but this is very expensive. A goal of the present invention is to provide a system for decreasing the microturbine/high speed generator spin-up time without increasing the size and cost of the power electronics.

SUMMARY OF THE INVENTION

The present invention provides a power supply system for providing long and short term backup power to a load. A system in accordance with the invention comprises a microturbine system, a flywheel system, and a power electronics module. The microturbine system includes a microturbine attached to a first, high speed motor-generator that includes a first stator, and the flywheel system includes a flywheel attached to a second motor-generator. According to the invention, the microturbine system is started by coupling a high frequency AC voltage output of the flywheel system to the stator of the first motor-generator.

In a presently preferred embodiment of the invention, the connection of the high frequency AC voltage to the stator involves no intervening electronics. Moreover, the high frequency AC voltage is preferably in the range of from about 500 Hz to about 2 kHz. Further, the power electronics module preferably comprises an inverter capable of motoring both the flywheel and the microturbine.

Other aspects of the present invention are described below.

DETAILED DESCRIPTION OF PREFERRED EMBODIMENTS

Overview

Power quality systems often incorporate short term backup systems and long term backup systems of the types discussed above. The short term backup systems provide stored energy that is available at all times, while the long term systems generate power that is available only after the delay involved in bringing the microturbine up to operate speed. The present invention provides a way to combine flywheel energy storage (for short term backup) with microturbine power generation (for long term backup) in such a way that the overall system does not suffer from long spin up delays in the microturbine. Importantly, the present invention permits this to be accomplished without using expensive, over-rated power electronics for spinning up the microturbine.

In particular, presently preferred embodiments of the invention start the high speed microturbine by directly connecting a high frequency AC voltage output from a flywheel to the microturbine motor-generator stator with no intervening electronics. Since microturbines turn relatively quickly, a direct drive motor-generator is driven with about 500 Hz to 2 kHz to start the microturbine. This is the same frequency of voltage that can be obtained from some low speed flywheels. Very large surge currents can thus be obtained for quick starting of the microturbine, with no need for oversized and expensive power electronics.

It should be noted that a standard way of starting a microturbine is to use its direct drive permanent magnet generator as a motor for revving the microturbine up to some high speed. Power electronics convert either DC voltage or 50/60 Hz AC voltage to high-voltage variable-high-frequency AC, and drive the motor/generator from this high frequency AC. The cost of the power electronics for starting can be quite significant, and rules out fast starting of the microturbine. Furthermore, most flywheel generator systems have a flywheel and generator on the same shaft. The shaft speed must therefore remain substantially constant to provide good quality voltage to the load. Thus, most of the flywheel energy cannot be utilized. In contrast, the present invention permits the flywheel to operate over a large fraction of its speed range, thereby allowing most of the flywheel's stored energy to be used as necessary.

Two presently preferred embodiments of the invention will now be described with reference to FIGS. 3–5.

Combined Flywheel-Microturbine System

Figure 1:
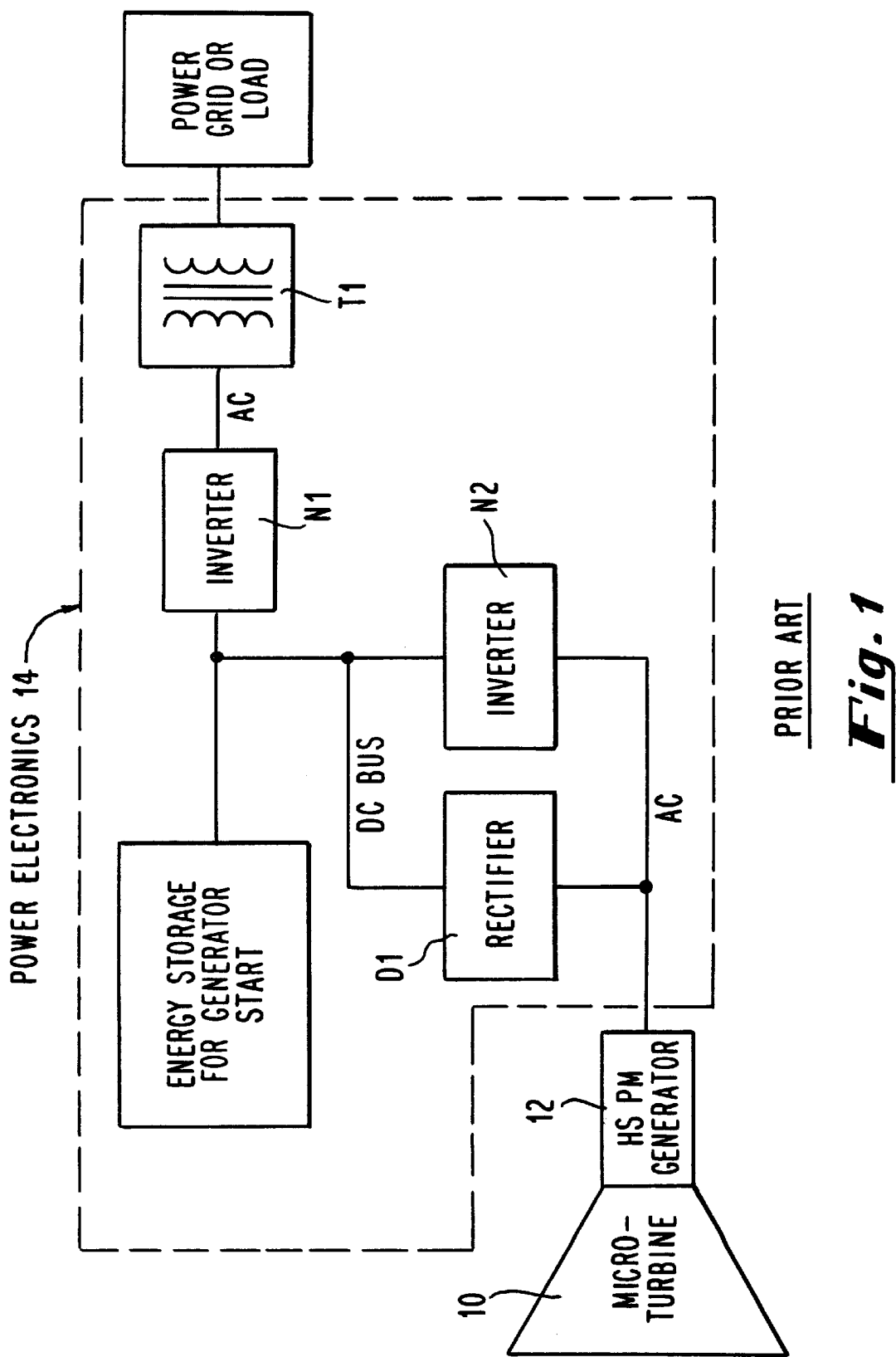
FIG. 1 schematically depicts a system for providing long term backup power to a power grid or load.
Figure 2:
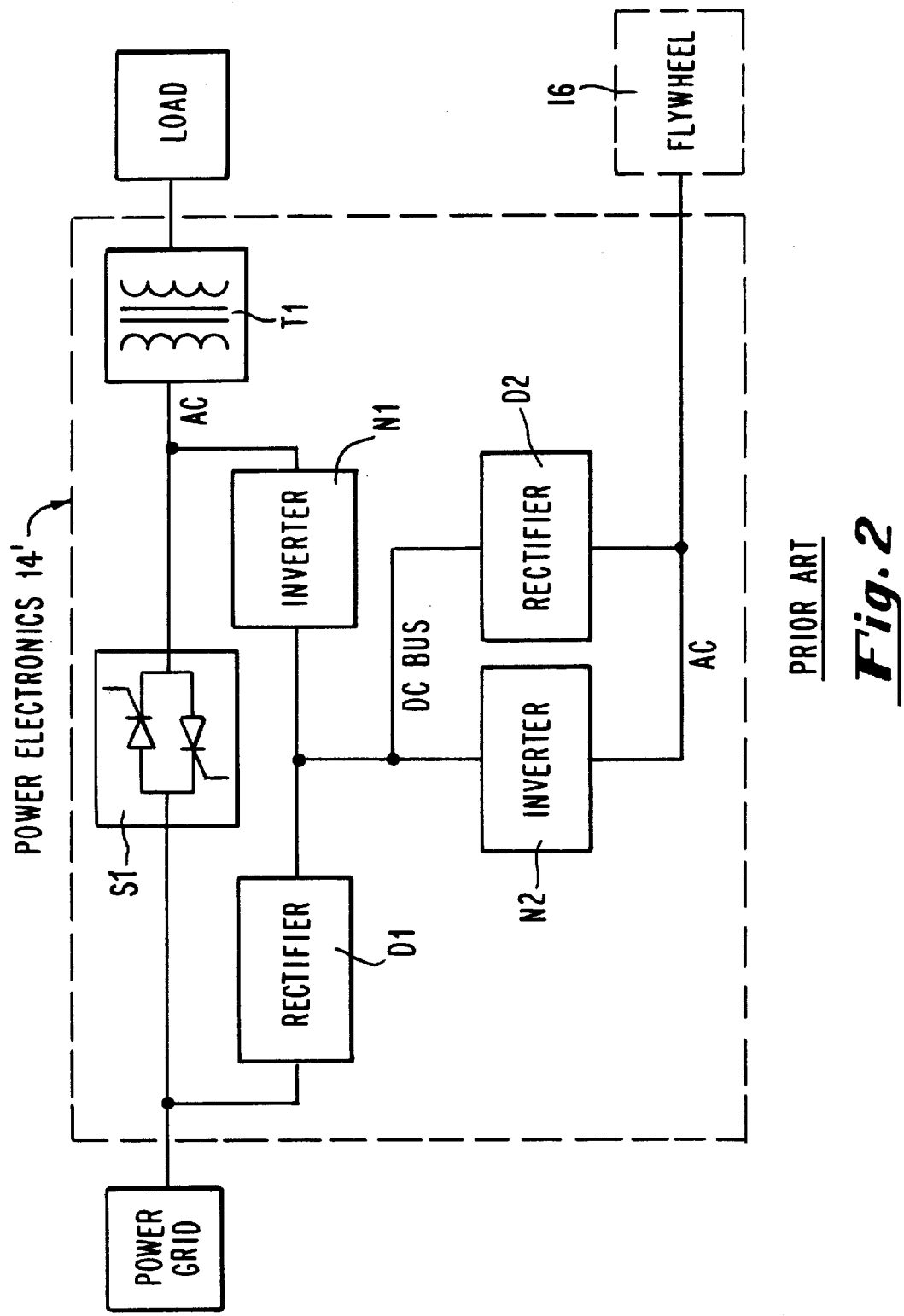
FIG. 2 schematically depicts a system for providing short term backup power to a power grid or load.
Figure 3:
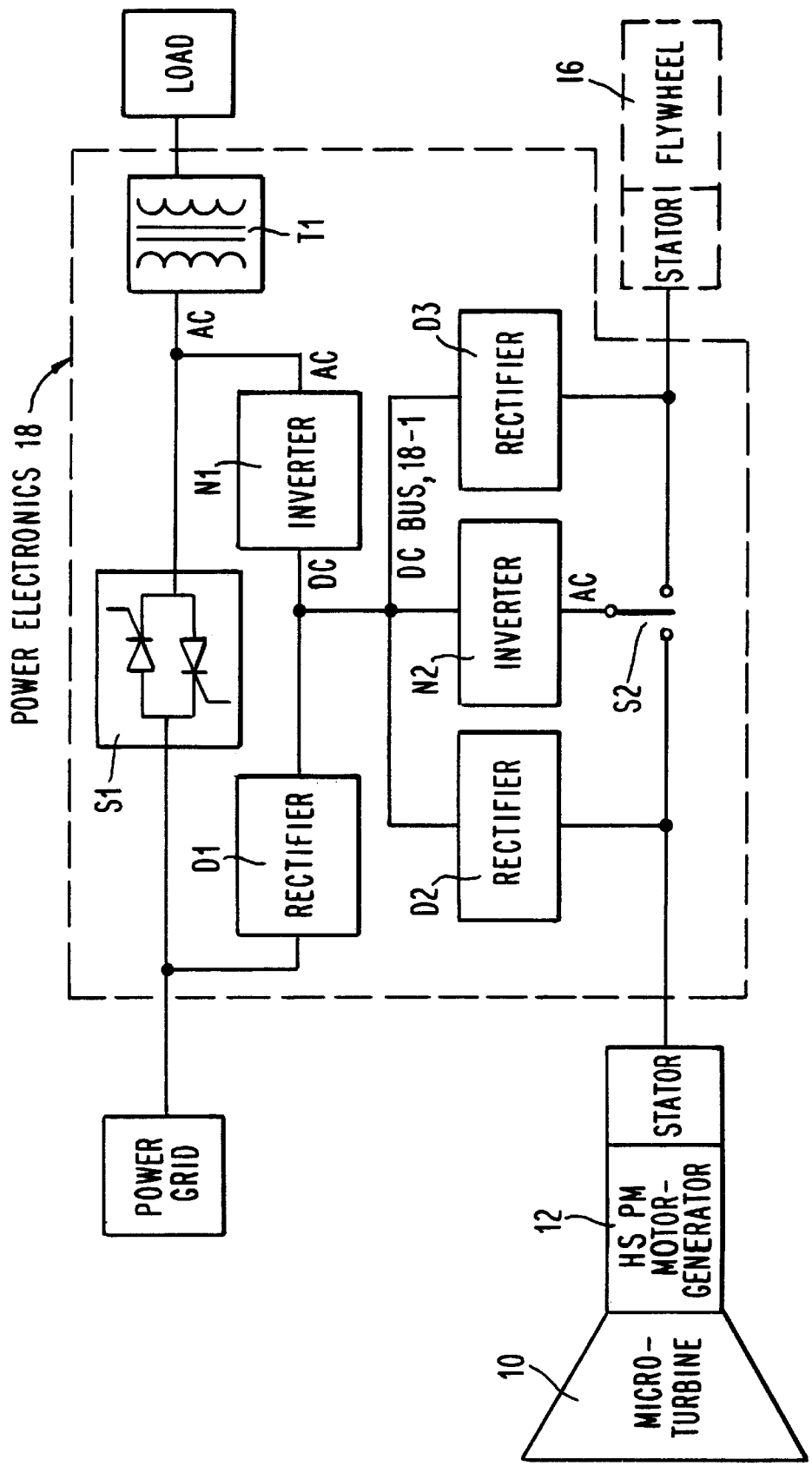
FIG. 3 schematically depicts a system in accordance with the present invention for providing both long, and short term backup power to a power grid or load.

FIG. 3 depicts a first embodiment of a combined flywheel-microturbine system in accordance with the present invention. This system comprises a microturbine 10, high speed permanent magnet generator 12, and flywheel 16. In addition, the system includes a power electronics module 18 that serves as an interface between the microturbine-generator, flywheel, load and power grid, as shown. When continuous backup power is required, the system uses short term, quickly available storage, such as is found in the flywheel 16, as well as long term storage, such as is found in the fuel-powered microturbine generator 10, 12. Many advantages come from combining the flywheel and microturbine-generator into one system. Notice that the power electronics components required for the combined system are for the most part the same as the components employed in the systems shown in FIGS. 1 and 2, respectively. In other words, the combined system of FIG. 3 includes inverters N1 and N2; rectifiers D1, D2 and D3; a transformer T1; and a semiconductor switch S1. Switch S1 is a static (or possibly mechanical) bypass switch. In an on-line UPS configuration, switch S1 is normally off. It is turned on only for overloads, faults in the load, or in the event of an inverter failure. In an off-line UPS configuration, S1 would normally be on. It would only be turned off if the grid voltage goes out of specification. The individual components of the system of FIG. 3 may be the same as the corresponding components utilized in the systems of FIGS. 1 and 2. In addition, the system of FIG. 3 includes a switch S2 (which may be mechanical or electronic) for alternatively connecting the AC port of inverter N2 to either the generator 12 or flywheel 16.

The system in FIG. 3 operates as follows: During normal operation, switch S2 is in the position in which it connects inverter N2 to flywheel 16, and the power grid provides energy to the DC bus 18-1. This energy flows through inverter N2 to spin the flywheel 16 up to speed, and the energy also flows through inverter N1 to provide power to the load or to the grid. When the power grid fails, the flywheel 16 discharges through rectifier D3 to the DC bus 18-1. This energy then flows through inverter N1 to provide power to the load or grid. At the same time, i.e., when the power grid fails, some of the energy from the DC bus 18-1 powers inverter N2, which is now connected through mechanical switch S2 to the microturbine 10 and generator 12. (For example, when the DC bus voltage decreases, indicating a failure of the grid voltage, the flywheel begins to discharge to support the DC bus. If the grid failure lasts more than a predetermined period of time, e.g., 2 seconds, the main controller (not shown) commands switch S2 to connect N2 to the microturbine generator and go through a turbine startup sequence.) When the microturbine 10 reaches operating speed and is capable of operating at full power, inverter N2 once again connects to the flywheel 16 via switch S2. The flywheel 16 then spins up in speed while the microturbine high speed generator 10, 12 provides energy to the DC bus 18-1, for powering the flywheel and the load (or grid).

As mentioned, the flywheel 16 discharges through rectifier D3 to the DC bus when the power grid fails. The mechanism for changing from charge mode to discharge mode depends on the particular flywheel system. For example, a synchronous motor will naturally generate voltage with no change to it. It could thus naturally flow between charge mode and discharge mode. In practice, however, it is usually desirable to control the field coil to compensate the amplitude for speed and load changes. Some systems might require a control signal to command the system to change from charge mode to discharge mode. With these systems, a controller (not shown) would monitor the DC bus voltage. When the power grid fails, or goes out of specification, the DC bus voltage quickly decays (in practice, an electrolytic capacitor across the bus prevents the voltage from decaying instantaneously). When the DC bus voltage falls below a predetermined threshold, the flywheel is commanded to discharge until the DC bus rises back above the threshold.

The system shown in FIG. 3 may be a good solution for some systems. However, some systems will not operate optimally for the following reasons: While the microturbine 10 is starting, the flywheel 16 provides energy to the load. Since the flywheel system will typically contain very limited energy storage, it is desirable for the microturbine to start quickly. Inverter N2 may therefore need to be sized well above the full power rating of the load to start the microturbine within a few seconds. This equipment oversizing may substantially increase the cost of the system. The enhanced system described next overcomes this problem.

Enhanced Turbine Starting

Figure 4:
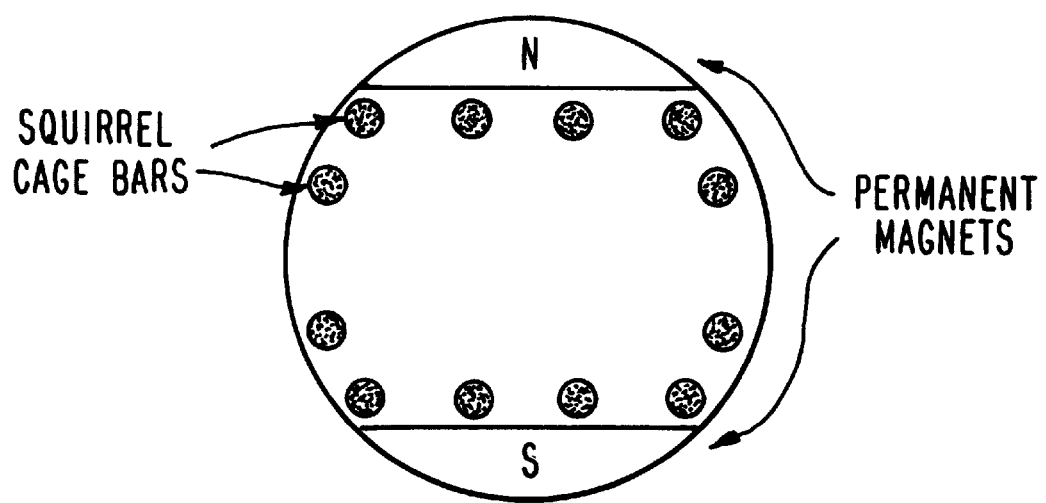
FIGS. 4 and 5 depict an alternative and preferred embodiment of the inventive system for providing long and short term backup power.
Figure 5:
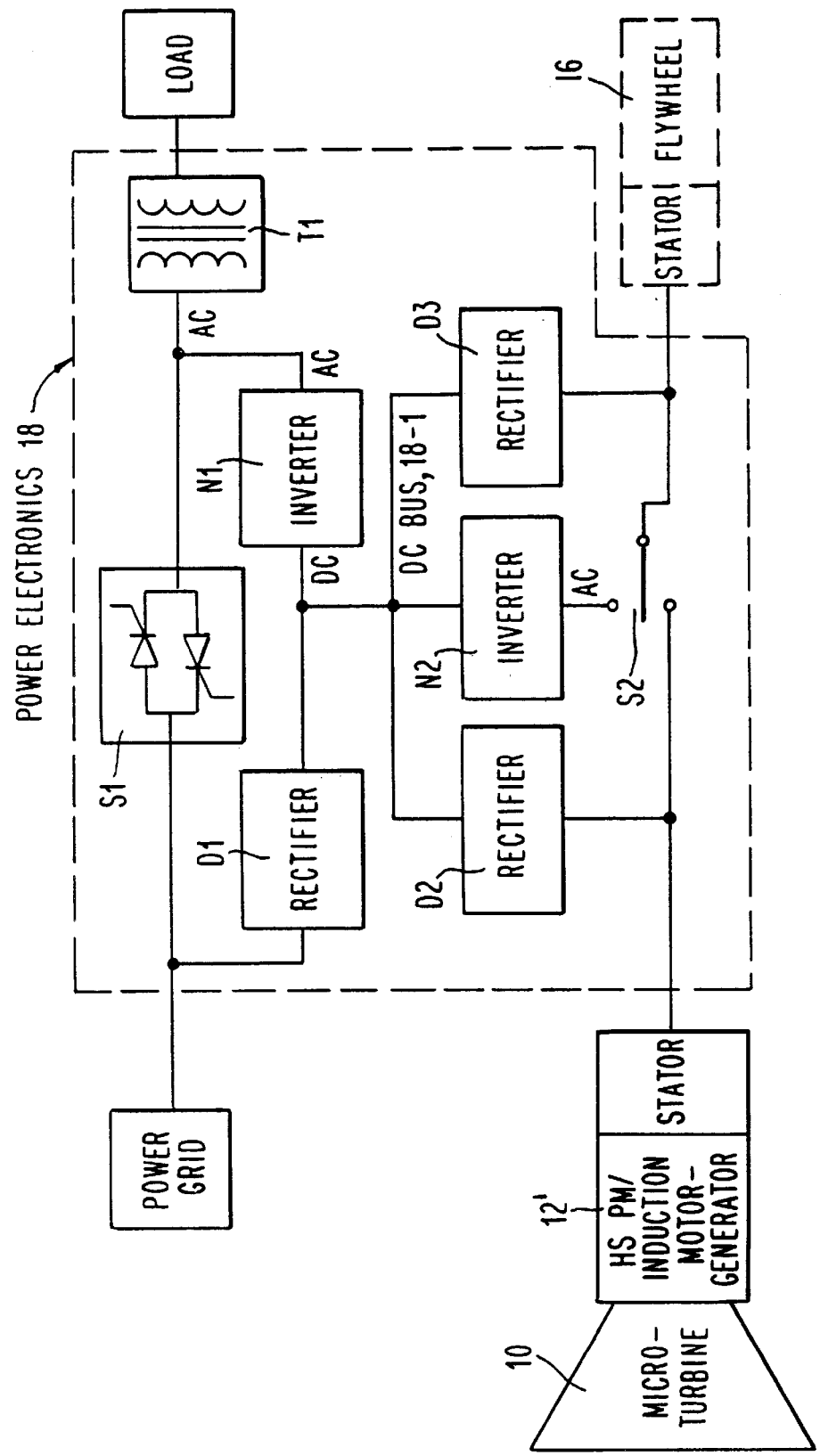

FIGS. 4 and 5 show a solution to the problem of starting the turbine quickly. In this embodiment of the invention, the turbine high speed generator 10, 12 includes squirrel cage bars added to include an induction motor within the permanent magnet motor-generator 12' (FIG. 5). FIG. 4 shows a permanent magnet rotor with added squirrel cage bars. Many configurations and shapes are possible for the squirrel cage bars, such as bars that make use of the deep bar effect, thus increasing the rotor resistance (and hence decreasing the inrush current) at low speeds.

As shown in FIG. 5, the high speed generator 12' can then be started with a high frequency, high voltage field applied directly to the stator. It is thus possible to start the microturbine 10 by connecting its three-phase stator directly to the three-phase stator on the flywheel 16. Series impedances, such as inductors, may have to be added to limit the current. These series impedance may be added into the circuit for none, part, or all of the turbine start-up sequence.

The solution shown in FIG. 5 allows inverter N2 to be sized much smaller than would be required for full load power, and yet the microturbine 10 will be able to start very quickly. This solution also eliminates the complex control required to spin up a permanent magnet motor from standstill to a high frequency.

Another advantage of the present invention is as follows. Engine generators have a limited ability to quickly adjust their output to follow transient load changes (e.g., the load suddenly increases and the engine takes a while, perhaps 1 or 2 seconds, to catch up). This is particularly true for microturbines, somewhat true for natural gas reciprocating engines, and less true for diesels. The overall system shown in FIGS. 3 and 5 would allow the flywheel to supply energy during transient loads. Since flywheels have practically infinite cycling ability, such a system would provide a significant advantage over a system using batteries. Batteries would have a much shorter lifetime under such conditions, particularly if the load transients occurred with great frequency.

In sum, the present invention may be utilized in connection with any power electronics system capable of interfacing a DC bus, power grid or load to (a) a flywheel attached to a motor-generator and/or (b) a microturbine attached to a high speed motor-generator. The invention may be embodied in various forms with various features, including the following:

(1) The use of a common inverter to charge the flywheel and start the microturbine. In this respect, the microturbine motor-generator should be able to operate as a synchronous motor.

(2) The use of the flywheel stator voltage to excite the stator of the microturbine only to start it. The microturbine motor-generator should be able to operate as an induction motor for starting, and preferably as a synchronous generator for running (see stator construction of FIG. 4).

(3) The use of the flywheel stator voltage to excite the stator of the microturbine for both starting and running. The microturbine motor-generator should be able to operate as an induction motor-generator. There would then be no need to operate the microturbine as a synchronous generator. This would lower the output efficiency but decrease the cost of the high speed motor-generator. It would also allow for higher rotational speeds and higher operating temperatures for the high speed motor-generator, since no permanent magnet material would be required.

(4) Same as (3) except that the inverter N2 could be used to generate exciting voltage on the high speed induction generator during operation. The high speed motor-generator could be started either with inverter N2 or the flywheel stator voltage.

The present invention may be implemented with various UPS topologies. FIG. 2, for example, illustrates a common on-line topology. The on-line and off-line topologies would appear the same in block diagram form. The difference is in the size of the power electronics block and in the way it functions. In an on-line system, grid power is rectified to DC, via the DC bus, and then inverted to AC. A battery or other DC source sits on the DC bus, so that, when the grid fails, the load does not see a difference. Switch S1 acts as a static bypass in case there is a fault on the load or in case the inverter malfunctions. In an on-line system, switch S1 is normally off and the load power is normally processed through rectifier D1 and inverter N1. In an off-line system, S1 is normally on, so that the grid power goes directly to the load via S1 and transformer T1. When the grid fails, then S1 is turned off and N1 is turned on. The physical difference between the two systems is as follows: In an on-line system, no control is necessary to determine whether or not to turn the inverter on, since it is always on. The losses in an on-line system are typically much higher since the power is processed through D1 and N1 continuously. In an on-line system, D1 is sized for full power, whereas in an off-line system D1 need only be sized for recharging the DC storage element. A line-interactive system would look almost the same, except that there would be an inductor between S1 and T1, and N1 would tie into a tap on the inductor rather than directly to T1. The inverter output can then interact with the grid power to maintain the correct output voltage for sags, dips and swells. For complete grid outages, the line-interactive version would work similarly to an off-line version.

The scope of protection of the following claims is not limited to the presently preferred embodiments described above. For example, the invention may be used with standard low speed generators. There are several available flywheel-generator systems that start the generator by connecting the flywheel and generator through a mechanical clutch. If induction bars are added to the generator, then the generator could be started instead through an exciting voltage such as could be generated either by some low speed flywheel systems or by inverter N2. Furthermore, the low speed generator could be made less expensive by making it strictly an induction motor-generator and operating it as discussed in points (3) and (4) above. Other modifications of the presently preferred embodiments will be apparent in view of the above detailed description.

I claim:

1. A power supply system, comprising:
    a microturbine system including a microturbine attached to a first, high speed motor-generator;
    a flywheel system including a flywheel attached to a second motor-generator;
    a power electronics module interconnecting a power grid, a load, the microturbine system and the flywheel system;
    wherein the microturbine system is started by a high frequency AC voltage output of the flywheel system to the first motor-generator in case of power grid failure, and the power electronics module coordinates power distribution from the microturbine system to the load and to the flywheel system.

2. A system as recited in claim 1, wherein the high frequency AC voltage is coupled to a stator of the first motor-generator by a connection involving no intervening electronic converters.

3. A system as recited in claim 1, wherein the high frequency AC voltage is in the range of from about 500 Hz to about 2 kHz.

4. A system as recited in claim 1, wherein the power electronics module comprises an inverter capable of motoring the flywheel and motoring the microturbine.

5. A system as recited in claim 1, wherein the power electronics module includes a DC bus interfaced to the flywheel system and to the microturbine system.

6. A system as recited in claim 1, further comprising a second inverter, wherein the DC bus is interfaced with a power grid or a load through the second inverter.

7. A system as recited in claim 1, wherein the microturbine high speed motor-generator is capable of operating as an induction motor, through either a squirrel cage or additional windings in a rotor.

8. A system as recited in claim 7, wherein the flywheel system includes a stator electrically connected to the microturbine motor without any AC-DC-AC conversion for purposes of bringing the microturbine up to operating speed.

9. A system as recited in claim 7, wherein the first motor-generator remains connected to a stator of the flywheel system during normal operation, and the second motor-generator provides voltage excitation to the first motor-generator.

10. A system as recited in claim 1, wherein the flywheel system includes a stator that is connected to a DC bus of the power electronics module through a rectifier.

11. A system as recited in claim 1, wherein:

the high frequency AC voltage is coupled to a stator of the first motor generator by a connection comprising no intervening electronic converters;

the high frequency AC voltage is in the range of from about 500 Hz to about 2 kHz; the power electronics module comprises an inverter for motoring both the flywheel and the microturbine; and the power electronics module comprises a DC bus interfaced to the flywheel system and the microturbine system.

12. A system as recited in claim 11, wherein:

the microturbine high speed motor-generator is capable of operating as an induction motor, through either a squirrel cage or additional windings in a rotor;

the flywheel system includes a stator attached to the microturbine motor without any AC-DC-AC conversion for purposes of bringing the microturbine up to operating speed;

the first motor-generator remains connected to a stator of the flywheel system during normal operation, and the second motor-generator provides voltage excitation to the first motor-generator; and the flywheel system includes a stator connected to the DC bus of the power electronics module through a rectifier.

13. A method for operating a power supply system that includes a power grid, electrical load, microturbine system, flywheel system, and power electronics module, comprising:

electrically coupling the microturbine system to the flywheel system;

using the flywheel system to generate a high frequency AC voltage output;

starting the microturbine system with the high frequency output of the flywheel system; and wherein power is supplied from the power grid to the load and the flywheel system under normal conditions, and, during power grid failure, power is supplied to the load and the flywheel from the microturbine system.

14. A method as recited in claim 13, wherein the microturbine system includes a microturbine attached to a first, high speed motor-generator; the first motor-generator includes a first stator; and the microturbine system is started by applying the high frequency AC output voltage to the stator of the first motor-generator.

15. A method as recited in claim 14, wherein the high frequency AC output of the flywheel system is coupled to the stator via a power electronics module.

16. A method as recited in claim 15, wherein the flywheel system includes a flywheel attached to a second motor-generator.

17. A method as recited in claim 16, wherein the high frequency AC voltage is coupled to the stator by a connection involving no intervening electronic converters.

18. A method as recited in claim 16, wherein the high frequency AC voltage is in the range of from about 500 Hz to about 2 kHz.

19. A method as recited in claim 16, wherein the power electronics module comprises an inverter capable of motoring the flywheel and motoring the microturbine.

20. A method as recited in claim 16, wherein the power electronics module includes a DC bus interfaced to the flywheel system and to the microturbine system.

21. A method as recited in claim 16, wherein the microturbine high speed motor-generator is operated as an induction motor.

22. A method as recited in claim 21, wherein the flywheel system includes a stator electrically connected to the microturbine motor without any AC-DC-AC conversion for purposes of bringing the microturbine up to operating speed.

23. A method as recited in claim 21, wherein the first motor-generator remains connected to a stator of the flywheel system during normal operation, and the second motor-generator provides voltage excitation to the first motor-generator.

* * * * *